(12) United States Patent
Martin

(10) Patent No.: US 10,609,718 B2
(45) Date of Patent: *Mar. 31, 2020

(54) COMMUNICATIONS DEVICE AND METHOD

(71) Applicant: Sony Corporation, Tokyo (JP)

(72) Inventor: Brian Alexander Martin, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,833

(22) Filed: Dec. 21, 2018

(65) Prior Publication Data

US 2019/0124670 A1     Apr. 25, 2019

Related U.S. Application Data

(63) Continuation of application No. 15/109,774, filed as application No. PCT/EP2014/078093 on Dec. 16, 2014, now Pat. No. 10,194,453.

(30) Foreign Application Priority Data

Jan. 31, 2014   (EP) .................................. 14153512

(51) Int. Cl.
    *H04W 4/00*      (2018.01)
    *H04W 72/12*      (2009.01)
    *H04W 76/14*      (2018.01)

(52) U.S. Cl.
    CPC ........... *H04W 72/12* (2013.01); *H04W 76/14* (2018.02)

(58) Field of Classification Search
    CPC ..... H04W 72/12; H04W 76/14; H04W 92/18; H04W 72/1263

(Continued)

(56) References Cited

U.S. PATENT DOCUMENTS

| 9,380,569 B2 | 6/2016 | McNamara |
|---|---|---|
| 9,480,065 B2 | 10/2016 | McNamara |

(Continued)

FOREIGN PATENT DOCUMENTS

| CN | 102165719 A | 8/2011 |
|---|---|---|
| CN | 102638893 A | 8/2012 |

(Continued)

OTHER PUBLICATIONS

International Search Report dated Mar. 23, 2015 in PCT/EP2014/078093 filed Dec. 16, 2014.

(Continued)

*Primary Examiner* — Chuong T Ho
(74) *Attorney, Agent, or Firm* — Xsensus LLP

(57) ABSTRACT

A communications device includes a transmitter configured to transmit signals to one or more other communications devices via a wireless access interface, the one or more communications devices configured to perform device-to-device communications. A receiver is configured to receive signals from the one of the other communications devices via the wireless access interface, and a controller controls the transmitter and receiver to transmit or to receive the signals via the wireless access interface to transmit or to receive data represented by the signals. The wireless access interface provides a scheduling region including plural predetermined sections of communications resources, and plural sections of shared communications resources. Transmission of a scheduling assignment message in a section of the scheduling region informs other devices of a group that a communications device will transmit signals representing data in a corresponding section of the shared communications channel.

21 Claims, 10 Drawing Sheets

(58) Field of Classification Search
USPC .................................................. 370/329, 330
See application file for complete search history.

(56) References Cited

U.S. PATENT DOCUMENTS

| | | | |
|---|---|---|---|
| 2011/0170527 | A1* | 7/2011 | Yamamoto .......... H04L 27/2655 370/338 |
| 2012/0300662 | A1 | 11/2012 | Wang et al. |
| 2012/0322484 | A1 | 12/2012 | Yu |
| 2013/0059583 | A1 | 3/2013 | Van Phan et al. |
| 2013/0109301 | A1 | 5/2013 | Hakola et al. |
| 2013/0150051 | A1 | 6/2013 | Van Phan et al. |
| 2013/0155962 | A1* | 6/2013 | Hakola ................. H04W 76/14 370/329 |
| 2013/0170387 | A1 | 7/2013 | Wang et al. |
| 2013/0223352 | A1 | 8/2013 | Sartori et al. |
| 2013/0258996 | A1 | 10/2013 | Jung et al. |
| 2013/0272196 | A1 | 10/2013 | Li et al. |
| 2013/0322413 | A1 | 12/2013 | Pelletier et al. |
| 2014/0010212 | A1 | 1/2014 | McNamara |
| 2014/0036878 | A1* | 2/2014 | McNamara ....... H04W 72/1289 370/336 |
| 2014/0086158 | A1 | 3/2014 | Tavildar |
| 2014/0328329 | A1* | 11/2014 | Novlan ............... H04W 72/042 370/336 |
| 2014/0369292 | A1 | 12/2014 | Wu et al. |
| 2015/0043448 | A1 | 2/2015 | Chatterjee |
| 2015/0319745 | A1* | 11/2015 | Seo ................... H04W 72/0406 370/329 |
| 2017/0359735 | A1* | 12/2017 | Jain ....................... H04W 24/02 |

FOREIGN PATENT DOCUMENTS

| | | |
|---|---|---|
| CN | 102792745 A | 11/2012 |
| TW | 201244383 A | 12/2012 |
| TW | 201316894 A | 4/2013 |
| TW | 201322648 A | 6/2013 |
| WO | 2009138820 A1 | 11/2009 |
| WO | 2013107277 A1 | 8/2013 |
| WO | 2013167748 A1 | 11/2013 |

OTHER PUBLICATIONS

"CSMA/CA Based Resource Selection" Samsung, 3GPP TSG-RAN WG2 #84, R2-133840, Nov. 2013, pp. 1-4.
"Medium Access for D2D Communication" LG Electronics Inc, 3GPP TSG-RAN WG2 #84, R2-134426, Nov. 2013, pp. 1-9.
"Possible Mechanisms for Resource Selection in Connectionless D2D Voice Communication" General Dynamics Broadband UK, 3GPP TSG-RAN2#84, R2-134248, Nov. 2013, 9 Pages.
"Simulation Results for D2D Voice Services Using Connectionless Approach" General Dynamics Broadband UK, 3GPP TSG-RAN2#84, R2-134431, 2013, 6 Pages.
Ran Xiaogang, et al., "D2D Resource Allocation under the Control of BS", Electronic Science and Technology of China, https://mentor.ieee.org/802.16/dcn/13/16-13-0123-02-000n-d2d-resource-allocation-under-the-control-of-bs.docx, 2013, 7 Pages.
"D2D Scheduling Procedure", Ericsson, 3GPP TSG-RAN WG2 #84, Tdoc R2-134238, vol. RAN WG2, XP 050736985, Nov. 13, 2013. pp. 1-7.
Dimitris Tsolkas, et al., "Enabling D2D Communications in LTE Networks" IEEE 24th International Symposium on Personal, Indoor and Mobile Radio Communications: Mobile and Wireless Networks, Sep. 8-11, 2013, pp. 2846-2850.
Arash Asadi, et al., "A Survey on Device-to-Device Communication in Cellular Networks" IEEE, Oct. 8, 2013, pp. 1-18.
"Study on LTE Device to Device Proximity Service" Qualcomm Incorporated, 3GPP TSG RAN Meeting #58, RP-122009, 2012, 6 Pages.
Extended European Search Report, dated Nov. 10, 2017 in Patent Application No. 17180498.2.
"D2D Communication Solutions" CATT, 3GPP TSG RAN WG2 Meeting #83, R2-13253 vol. RAN WG2, XP 050718224, Aug. 9, 2013, pp. 1-7.
"Network Control for Public Safety D2D Communications" Orange, Huawei, HiSilicon, Telecom Italia, 3GPP TSG-RAN WG2 Meeting #84, R2-133990, Nov. 2013, 5 Pages.
"The Synchronizing Central Node for Out of Coverage D2D Communication" General Dynamics Broadband UK, 3GPP TSG-RAN2 #84, R2-134246, Nov. 2013, 3 Pages.
Harri Holma, et al, "Basic System Architecture Configuration with Only E-UTRAN Access Network" LTE for UMTS OFDMA and SC-FDMA Based Radio Access, 2009, pp. 25-27 and cover page.
"Agreements from TSG RAN on Work on Public Safety Related Use Cases in Release 12" Vodafone, US Department of Commerce, UK Home Office, Motorola Solutions, General Dynamics Broadband UK, Telefonica, Ericsson, NSN, Alcatel-Lucent, TSG RAN Meeting #61, RP-13177, Sep. 2013, pp. 1-6.
"3rd Generation Partnership Project; Technical Specification Group Services and System Aspects; Study on Architecture Enhancements to Support Proximity-Based Services (ProSe) (Release 12)" Lte Advanced, 3GPP TR 23.703 V1.0.0, 2013, pp. 1-275.
"3rd Generation Partnership Project; Technical Specification Group Core Network and Terminals; Interworking Between the Public Land Mobile Network (PLMN) Supporting Packet Based Services and Packet Data Networks (PDN) (Release 10)" Lte Advanced, 3GPP TS 29.061 V10.0.0, 2010, pp. 1-155.
Taiwanese Office Action dated Nov. 26, 2018, issued in Taiwanese Patent Application No. 10721100310.
Office Action issued in Japanese Application No. 2016-543547 dated Jun. 20, 2018.
Ericsson, "D2D Scheduling Procedure", 3GPP TSG-RAN WG2 #84, San Francisco, USA, 8 pages total, (Nov. 11-15, 2013).
Intel Corporation, "Discussion on D2D Resource Allocation Method", 3GPP TSG RAN WG1 Meeting #75, San Francisco, USA, 6 pages total (Nov. 11-15, 2013).
Chinese Office Action dated Jan. 3, 2019, issued in corresponding Chinese Application No. 2014800740860.
Extended European Search Report dated Mar. 4, 2019, issued in corresponding European Application No. 18203608.

* cited by examiner

Another potential arrangement

More potential arrangements

COMMUNICATIONS DEVICE AND METHOD

CROSS-REFERENCE TO RELATED APPLICATIONS

The present application is a continuation of U.S. application Ser. No. 15/109,774, filed Jul. 5, 2016, which is a National Stage Entry based on PCT filing PCT/EP2014/078093 filed Dec. 16, 2014, and claims priority to European Patent Application 14 153 512.0, filed in the European Patent Office on Jan. 31, 2014, the entire contents of each of which being incorporated herein by reference.

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution to public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications devices.

SUMMARY OF THE DISCLOSURE

According to a first example embodiment of the present technique there is provided a communications device comprising a transmitter configured to transmit signals to one or more other communications devices via a wireless access interface, the one or more communications devices being arranged to perform device-to-device (D2D) communications. A receiver is configured to receive signals from the one of the other communications devices via the wireless access interface, and a controller controls the transmitter and the receiver to transmit or to receive the signals via the wireless access interface to transmit or to receive data represented by the signals. The wireless access interface provides a scheduling region comprising a plurality of predetermined sections of communications resources, and a plurality of predetermined sections of shared communications resources. Each of the plurality of predetermined sections of the scheduling region corresponds to at least one of the plurality of sections of the shared communications resources, so that transmitting in one of the plurality of the sections of the scheduling region reserves the corresponding section or sections of the shared communications resources for transmitting the signals representing the data.

Example embodiments of the present technique can provide a scheduling region or channel within a wireless access interface in which communications devices can transmit scheduling assignment messages in order to reserve corresponding sections of communications resources of a shared communications channel. Accordingly, a communications device which wishes to transmit data to other communications devices in a group may transmit a scheduling assignment message in one or more of the plurality of predetermined sections of the scheduling region. The transmission of the scheduling assignment message in a section of the scheduling region informs the other devices of the group that a communications device will transmit signals representing data in a corresponding section of the shared communications channel Other devices in the group which are not transmitting therefore monitor the scheduling region and if they detect a scheduling assignment message transmitted in one or more sections of the schedule assignment region then the devices attempt to detect and decode signals transmitted in a corresponding section of the shared communications resources channel. Accordingly a group of communications device can perform device-to-device (D2D) communications without the requirement for a central coordinating entity which can therefore improve efficiency with which communications resources are used.

In some examples the wireless access interface is divided into a plurality of time divided units. The schedule assignment region is provided in one of the time divided units and at least one other of the time divided units provides the shared communications resources. In some examples, the schedule assignment region is provided periodically in the time divided units separated by one or more other time divided units which provide the shared communications resources. Accordingly a power saving advantage can be provided to communications devices of the group because they only have to power up their receiver to receive the scheduling region periodically, the period corresponding to the relative ratio of the time unit in which the scheduling region is provided with respect to the time unit or units in which the shared communications resources are provided.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which:

FIGS. 10a to 10e provide example block diagrams illustrating further possible arrangements of wireless access interfaces in accordance with the present technique for supporting device-to-device communications.

DESCRIPTION OF EXAMPLE EMBODIMENTS

Conventional Communications System

Figure 1:
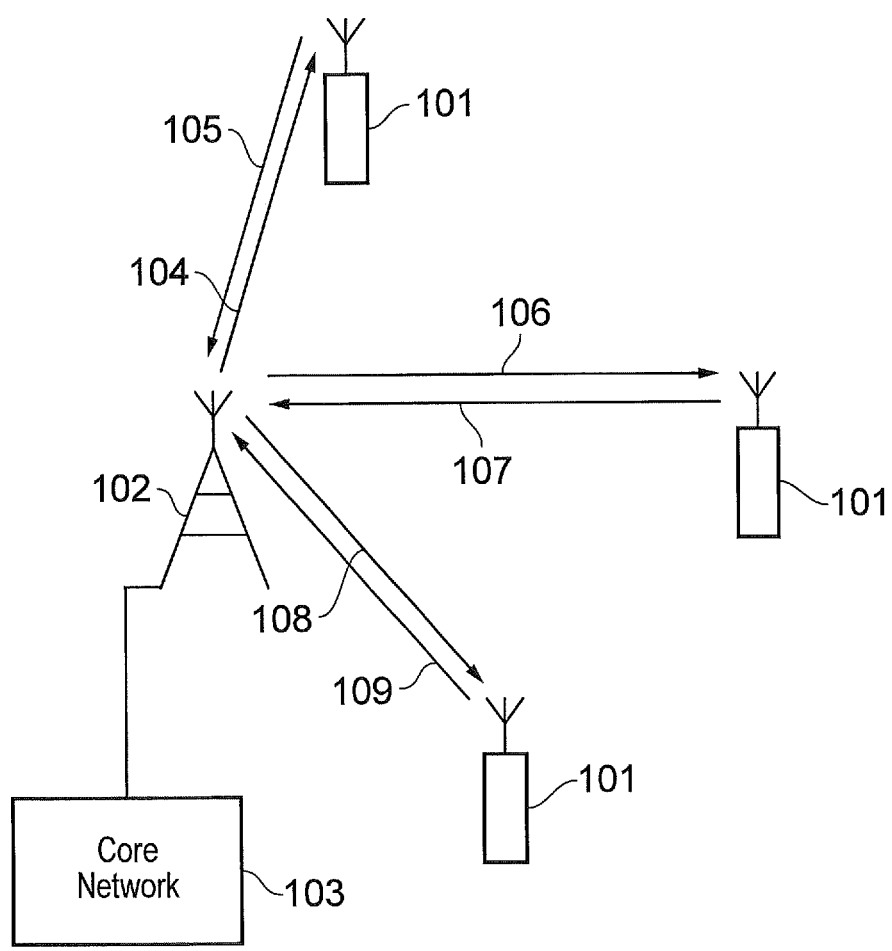
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
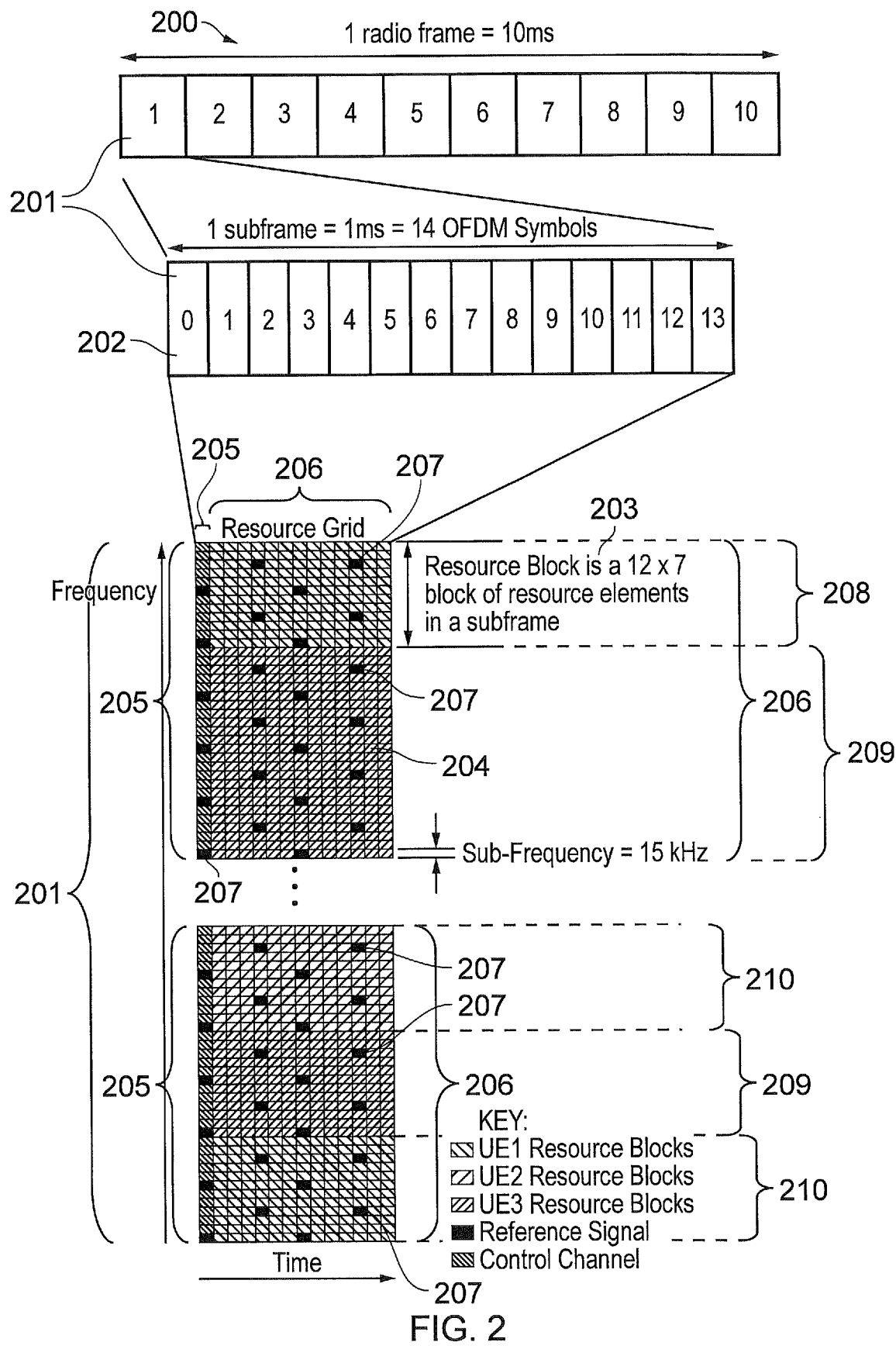
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
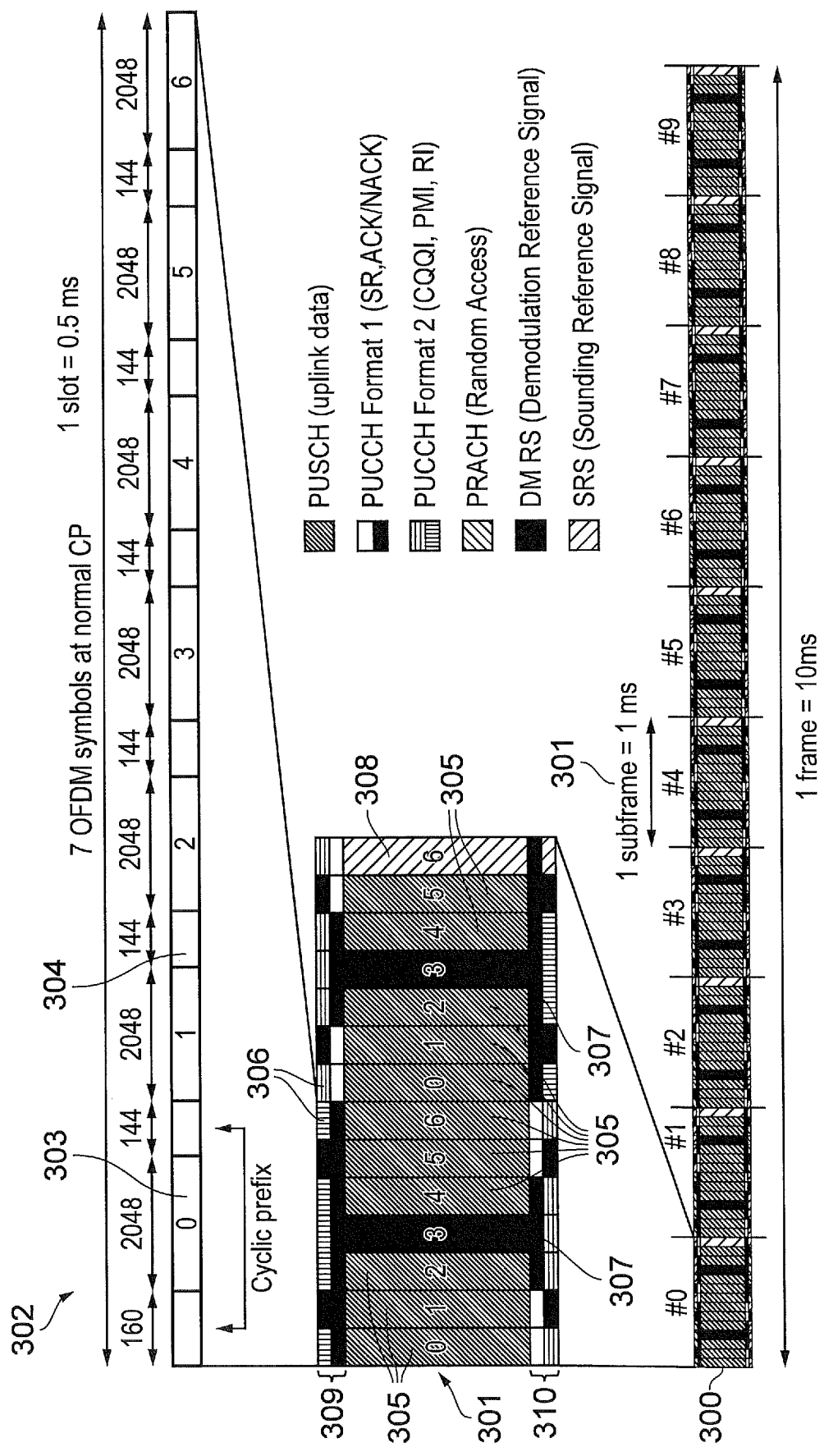
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
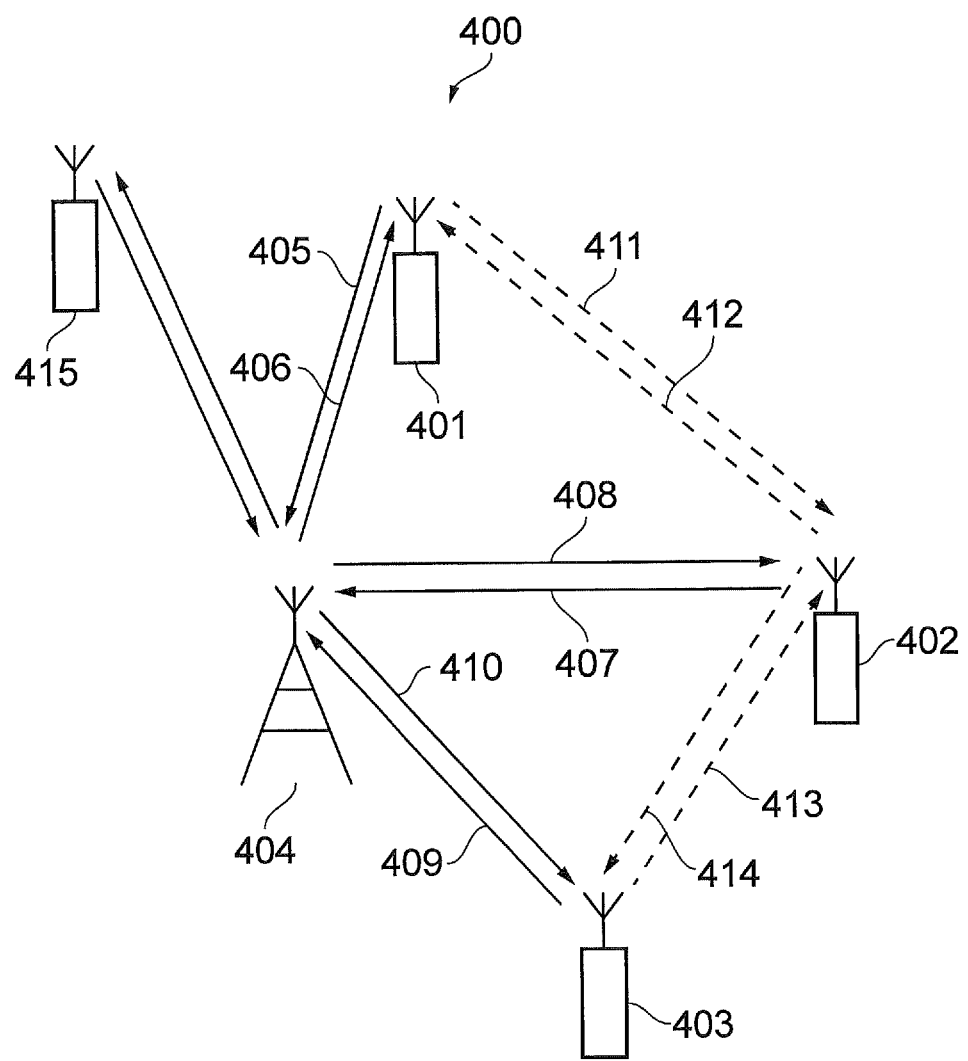
FIG. 4 provides a schematic diagram of a mobile communications system in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402.

Previously Proposed D2D Systems

It has previously been proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:

[2] R2-133990, Network control for Public Safety D2D Communications; Orange, Huawei, HiSilicon, Telecom Italia
[3] R2-134246, The Synchronizing Central Node for Out of Coverage D2D Communication; General Dynamics Broadband UK
[4] R2-134426, Medium Access for D2D communication; LG Electronics Inc In another arrangement one of the UEs of the group first sends a scheduling assignment, and then transmits data without a central scheduling UE or controlling entity controlling the transmissions. The following disclosures provide examples of this de-centralised arrangement:

[5] R2-134238, D2D Scheduling Procedure; Ericsson;
[6] R2-134248, Possible mechanisms for resource selection in connectionless D2D voice communication; General Dynamics Broadband UK;
[7] R2-134431, Simulation results for D2D voice services using connectionless approach General Dynamics Broadband UK In particular, the last two contributions listed above, R2-134248 [6], R2-134431 [7], disclose the use of a scheduling channel, used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed in [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

As a result of the possible approaches to the organisation of a D2D devices and networks, a number of scenarios may arise. A selection of example scenarios are provided by FIGS. 5a to 5d where each may cause different problems regarding the allocation of resources, the operation of D2D communications alongside conventional LTE communication and the movement of D2D capable devices between coverage areas provided by eNodeBs.

Figure 5A:
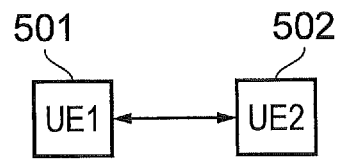
FIGS. 5a to 5d provides schematics diagrams of example device-to-device communications scenarios.

In FIG. 5a UEs 501 and 502 are outside of a coverage area of an eNodeB, consequently, the D2D devices may communicate with little or no regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
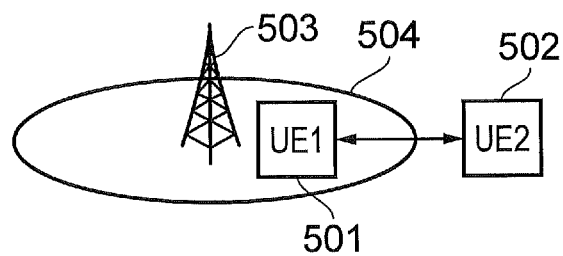

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 503, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE1 may for example perform resource allocation and then inform the eNodeB of the resources being utilised for D2D communications. The eNodeB will then reserve these resources for D2D communications.

Figure 5C:
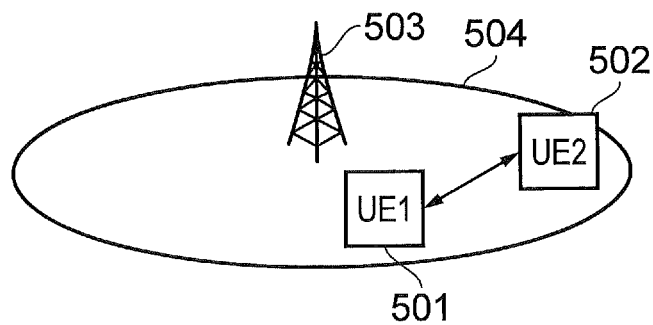

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
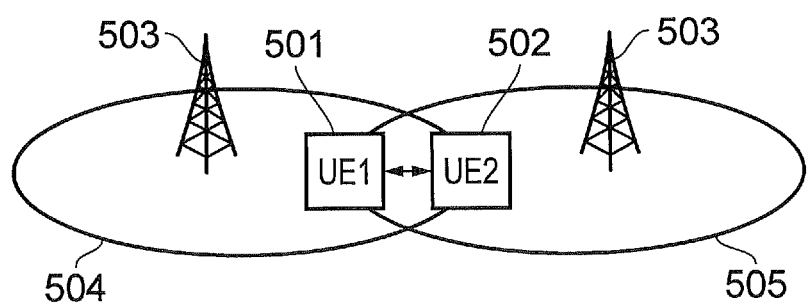

In FIG. 5d a fourth more complex D2D scenario is illustrated, where UE 501 and UE 502 are each within the coverage areas 504 505 of different eNodeBs 503 and 504 respectively. As for the scenarios of FIGS. 5b and 5c, coordination between the UEs performing D2D communications will be required if interference between D2D communications and conventional LTE communications is to be avoided. However, the presence of two eNodeB requires that resource allocations by the eNodeBs within the coverage areas 504 and 505 are required to be coordinated around the D2D resources allocations.

FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

Once a D2D communications link is established resources of the wireless access interface are required to be allocated to the D2D link. As described above it is likely that D2D communication will take place in spectrum allocated for LTE networks, consequently it has been previously proposed that when within a coverage area of an LTE network, D2D transmission are performed in the uplink spectrum and that SC-FDM is used . . . . Furthermore, as one of the motivating factors behind D2D communication is the increase in capacity that may result, utilising the downlink spectrum for D2D communications is not appropriate.

As previously described it would be desirable to provide an arrangement for D2D communications which do not significantly adversely affect conventional LTE communications when within a coverage area of one or more eNodeBs. To accomplish D2D communications in such situations, coordination is required between the UEs wishing the preform D2D communications and the serving eNodeB or predetermined knowledge of D2D resources are required, so that D2D and conventional LTE communications are not scheduled for a same set of resources. Furthermore, because D2D communications may coexist with conventional communications within a system, it is also desirable that D2D resource allocations and transmission do not interfere and are transparent to other UEs so any adverse effects on other UEs are reduced. However, generally a technical problem can be seen to provide an arrangement for performing D2D resource allocation, which reduces resource usage for scheduling information, and frees up resources for D2D data traffic. Accordingly scheduling assignment is desirable to the effect that the available communications resources can be allocated to the communications devices of the group.

Improved Device-to-Device Communications

Example embodiments of the present technique can provide an arrangement in which D2D communications can be performed between one or more communications devices which may form a group of communications devices. The group of communications devices may be arranged to perform D2D communication without requiring a central entity to control the transmission of signals from the communications devices to the other communications devices of the group. According to the present technique, a wireless access interface is provided which includes a scheduling region or channel in which scheduling assignment messages may be transmitted in a plurality of sections of communications resources. Thus the scheduling region may be referred to as a scheduling assignment region or channel Each of the plurality of communications resource has a corresponding section of resources of a shared communications channel. The transmission of a scheduling assignment message in one of the sections of the scheduling region can provide an indication to all of the other devices in a group that a communications device wishes to transmit signals representing data in a corresponding section of the shared communications resources.

As will be understood from the following examples, a scheduling region or channel within a wireless access interface provides communications devices with a facility to transmit scheduling assignment messages in order to reserve corresponding sections of communications resources of a shared communications channel A communications device can transmit data to other communications devices in a group by transmitting a scheduling assignment message in one or more of the plurality of predetermined sections of the scheduling region. The transmission of the scheduling assignment message in a section of the scheduling region informs the other devices of the group that a communications device will transmit signals representing data in at least one corresponding section of the shared communications channel Other devices in the group which are not transmitting therefore monitor the scheduling region and if they detect a scheduling assignment message transmitted in one or more sections of the schedule assignment region then attempt to detect and decode signals transmitted in a corresponding section or sections of the shared communications resources channel. Accordingly a group of communications device can perform D2D communications with improved resource efficiency.

In some examples, the schedule assignment region is provided periodically in time divided units separated by one or more other time divided units which provide the shared communications resources. Accordingly a power saving advantage is provided to communications devices of the group because the devices power up their receivers to receive the scheduling region periodically, the period corresponding to the relative ratio of the time unit in which the scheduling region is provided with respect to the time unit or units in which the shared communications resources are provided.

Figure 6:
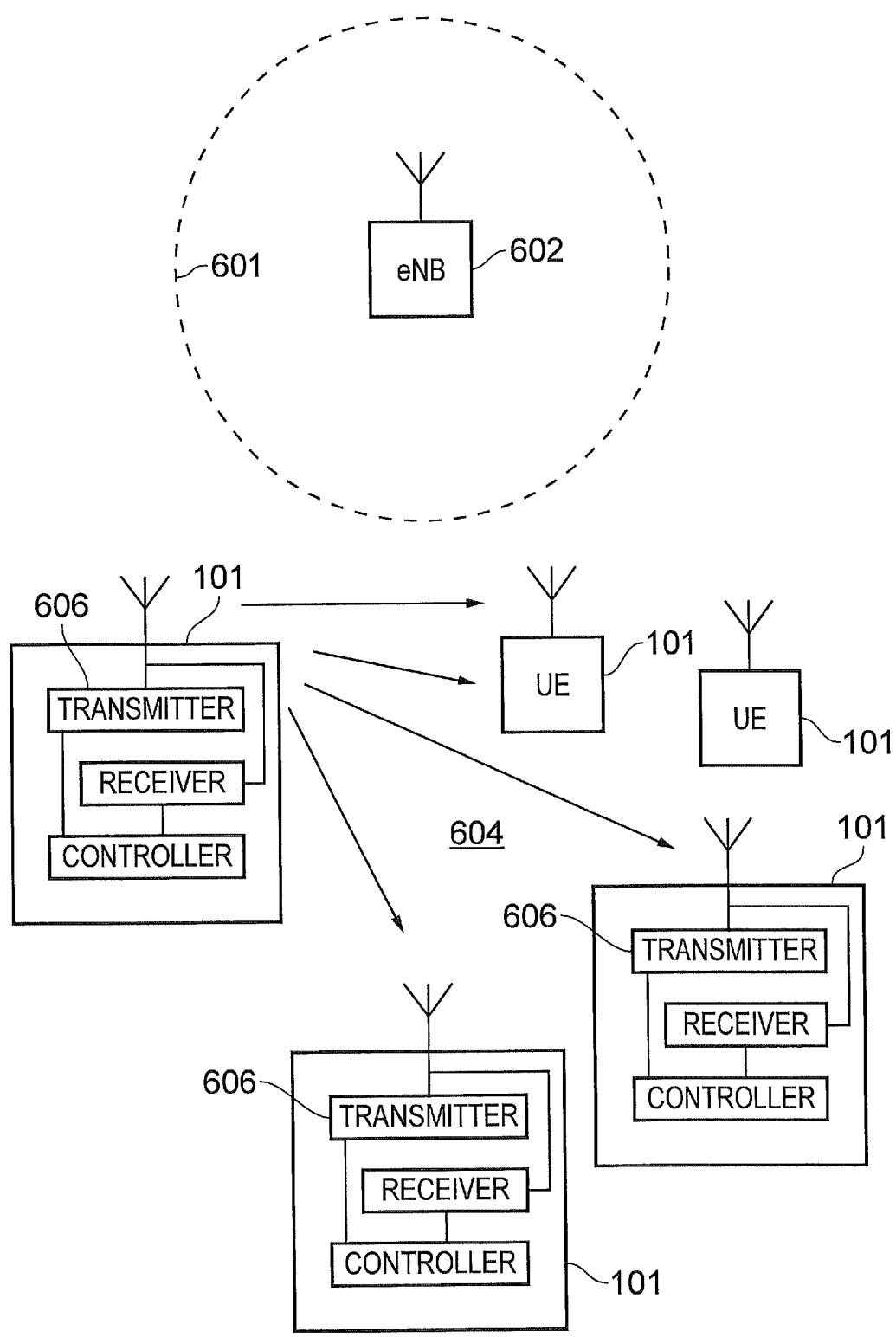
FIG. 6 provides a schematic block diagram illustrating an arrangement in which a plurality of communications devices form a group which perform device-to-device communications.

An example application is presented in FIG. 6. In FIG. 6, a plurality of communications devices 101 form a group of communications devices 604 for which D2D communications is desired for the reasons explained above. As represented in FIG. 6, the communications devices 101 are outside a coverage area represented by a broken line 601 of a base station 602. As such the base station 602 cannot form or control any of the communications between the devices. However as mentioned above in some examples the group of communications devices may operate within a coverage area provided by the base station 602 and accordingly it is desirable that the transmission of signals by the communications devices 101 does not interfere with transmissions to or from the e-Node B 602 by conventional communications devices. As such, in some examples, a wireless access interface which is formed by the communications devices 101 for performing the D2D communications may utilise an uplink frequency of a conventional communications device. The wireless access interface can be arranged to transmit signals to the eNode B 602 when operating in a conventional mode, and to transmit and receive data via a mobile communications network of which the base station 602 forms a part.

As shown in FIG. 6, each of the UEs 101 includes a transmitter 606 and a receiver 608, which perform the transmission and reception of signals under the control of the controller 610. The controller 610 control the transmitter 606 and the receiver 608 to transmit and receive data between members of the group to perform D2D communications.

Figure 7:
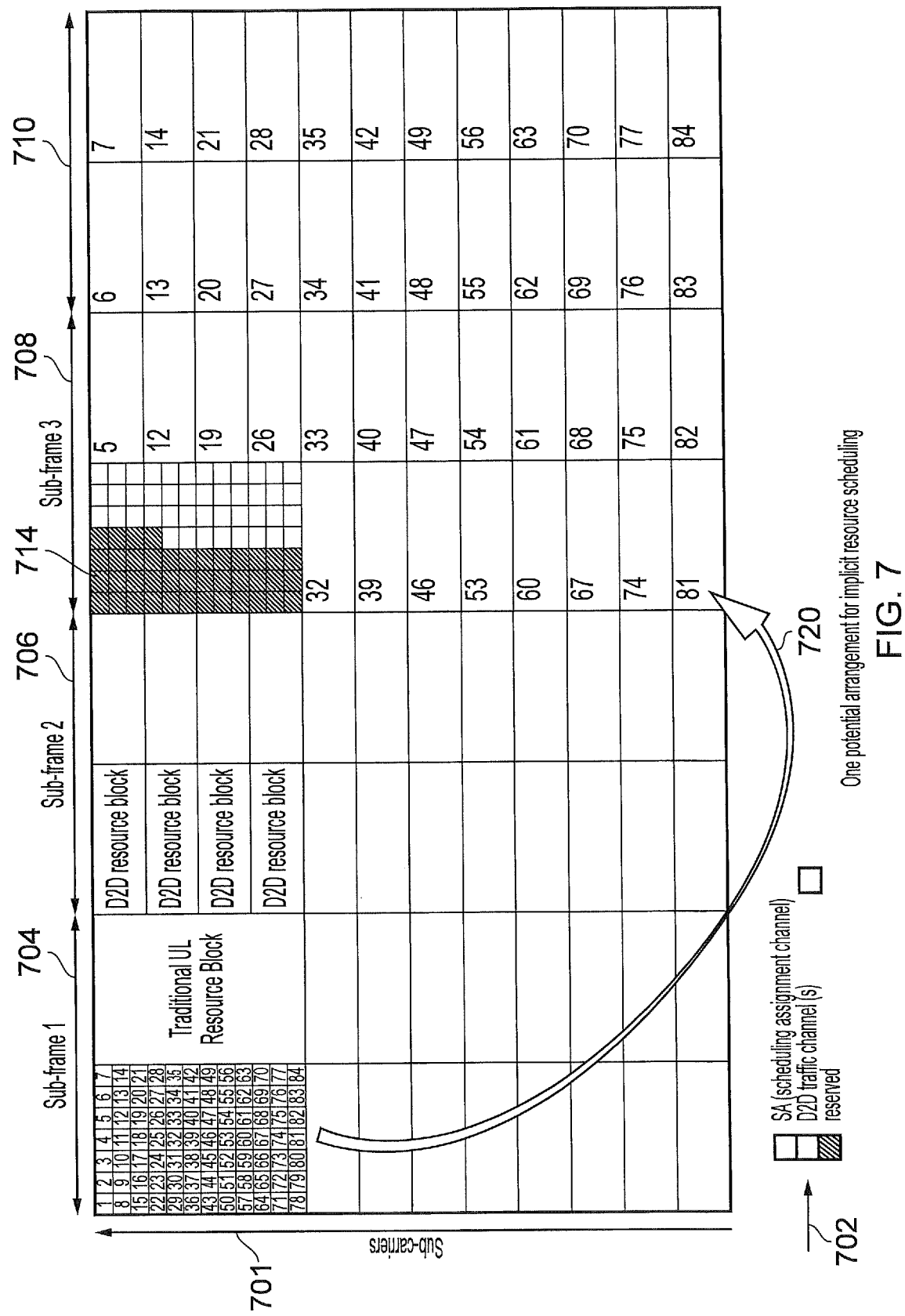
FIG. 7 is a schematic representation of a wireless access interface comprising a scheduling region and regions shared communications resources and illustrating an operation in accordance with the present technique for supporting device-to-device communications.

A wireless access interface which is configured to provide an arrangement for D2D communications is presented in FIG. 7. In FIG. 7, the wireless access interface is formed from a plurality of OFDM sub carriers 701 and a plurality of OFDM symbols 702 which can be divided into sections of communications resources. As shown in FIG. 7, the wireless access interface is divided into time divided units of sub frames 704, 706, 708, 710 of communications resource. As shown in FIG. 7, every other sub frame includes a scheduling region 712, 714. The scheduling region includes a plurality of sections of communications resource which are numbered in FIG. 7 from 1 to 84. A remaining part of the sub frame 704, 708 in which a scheduling region 712, 714 is included is divided into a plurality of sections of shared communications resources. Other sub frames in which there is no scheduling region 712, 714 are divided into sections of shared communications resource for the transmission of signals representing data by the communications device to other communications devices within the group. However, in combination a plurality of sections of communications resources of shared resources are provided within two sub frames 704, 706, 708, 710 and each of the sections of shared resource corresponds to one of the sections of the scheduling region 712, 714. Accordingly, in accordance with the present technique, a transmission by a communications device in one of the sections of the scheduling region of a scheduling assignment message indicates to the other communications devices within the group that the communications device which transmitted the scheduling assignment message in that section of the scheduling region intends to transmit data in a corresponding section of the shared communications resources in which data can be transmitted. Thus as represented by the arrow 720, the transmission of a scheduling assignment in section 81 of the scheduling region 712 provides an indication to the other communications devices in the group that the transmitting communications device that transmitted the scheduling assignment message intends to transmit data in the section numbered 81 of the scheduling assignment resource.

FIG. 7 therefore shows a potential arrangement for implicit resource scheduling. For the example shown in FIG. 7, the scheduling assignment resource or region 712 has been chosen to be one uplink resource block of a conventional LTE wireless access interface, transmitted every second subframe. However other configurations could be made as will be explained below. For simplicity, each traffic resource has been split into four device-to-device resource blocks. In some examples resource blocks for the device-to-device communications may not be the same as a conventional resource block for LTE. However as will be appreciated from the above explanation, each resource element of the scheduling assignment resource or region directly refers to a traffic resource block in the shared communications resources available to the D2D communications devices two subframes later. Accordingly, any communications device in the group of communications devices 604 or a scheduling communications device/eNodeB can use this scheduling assignment channel to indicate where it will transmit data.

In some examples, the scheduling assignment message may include one or more identifiers which may include but are not limited to an identifier of the transmitting communications device, an identifier of the destination device or devices, a logical channel identifier, transport channel identifier, and application identifier, or an identifier of the group of communications devices depending upon the application. For example if the group of communications devices were engaged in a push-to-talk communications session, then the scheduling assignment message would not need to identify the individual device, but only the group of communications devices. Other devices within the group, which detect the transmission of the scheduling assignment message in a section of the scheduling region will know not to attempt to transmit in the corresponding section of the shared communications resources for transmitting data and will detect the identifier of the group of communications devices. The devices of the group will therefore know to listen and to receive the data transmitted by the transmitting communications devices (UE), which transmitted the scheduling assignment message, which included the group identifier.

As shown in FIG. 7 the resource numbered 81 corresponds to a region in the next available communications resource for that number that is in the third sub frames 708. Thus there is a corresponding delay between transmission of the scheduling assignment message and the transmission of the data in order to provide notice to the other communications devices in the group that that particular section of the shared communications resources has been reserved by one of the communications devices for transmission.

The scheduling assignment message may in some examples include other information, for example information which is required for security, or information which identifies the type of content which will be sent in the shared resources such as discovery messages, or D2D voice or data traffic.

In some examples the scheduling assignment message transmitted by a communications device (UE), which intends to transmit data, may include an indication of a plurality of the sections of the shared communications resources in which it intends to transmit data. For example, the scheduling assignment message may include parameters N and M to schedule a block of N×M communications resource blocks from the shared communications resource channel. In one example the N×M resource blocks may indicated in the scheduling assignment message with respect to the section of the scheduling region in which the message was transmitted. This can be achieved by pre-configuring the controllers in the communications devices to recognise that a scheduling assignment message providing the parameters N and M will identify that the N×M communications resources blocks starting from the corresponding section in the shared communications resources channel to the section in the scheduling region in which the scheduling assignment message was transmitted.

Other Configurations of D2D Wireless Access Interface

As will be appreciated the arrangement of the wireless access interface of FIG. 7 for D2D communications by the group of devices shown is one example. There may also be other defined/fixed patterns of resource reservation that can be indicated with a resource element, which may span more than a just a few subframes and the scheduling assignment resource might take more than just one resource block.

Figure 8:
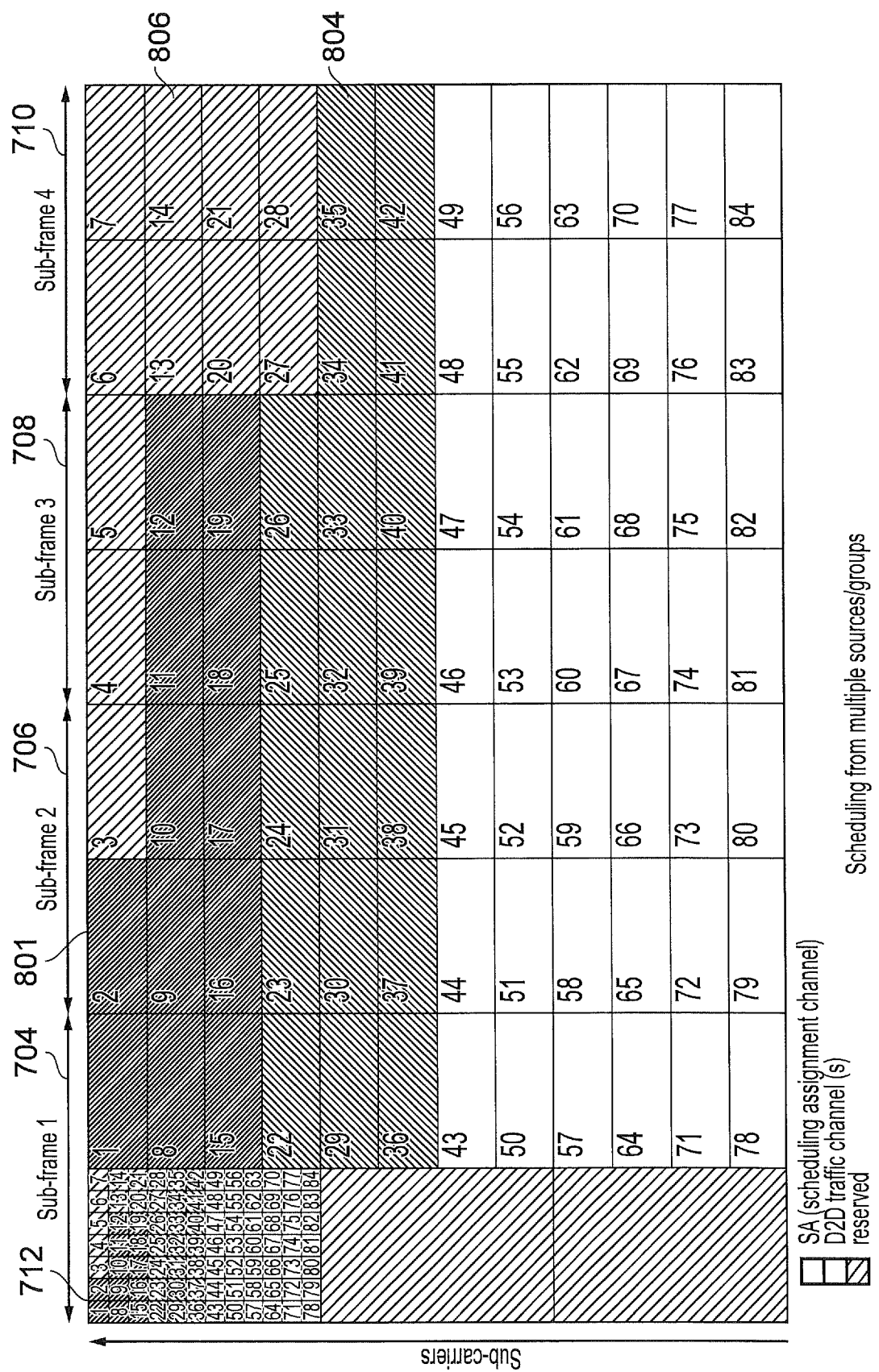
FIG. 8 is a schematic block diagram illustrating another arrangement of a wireless access interface in accordance with the present technique, for supporting device to device communications.

Another example is shown in FIG. 8 where corresponding sections of wireless access interface and features have corresponding reference numerals. In contrast to the arrangement showing in FIG. 7 the wireless access interface shown in FIG. 8 includes only a single scheduling region 712 and correspondingly the regions of shared resource for which there is a corresponding section of the scheduling region contain a greater amount of resources. In FIG. 8, examples are shown in which different communications devices reserve sections of resource of the shared communications resources channel by transmitting scheduling assignment messages in each of the sections of the scheduling region. In the above FIG. 8, the entire resource block is used for scheduling individual D2D resource blocks for the next four subframes. For example, a first communications device transmits scheduling assignment messages in sections 1, 9, 10, 11, 12, 16, 17, 18, 19 as shown by the darkest sections 801 whereas a second communications device transmits a scheduling assignment messages in the sections 23, 24, 25, 26, 30, 31, 32, 33, 34, 35, 37, 38, 39, 40, 41, 42 reserving the corresponding sections 804 whereas a third communications device transmits scheduling assignment messages in sections 3, 4, 5, 6, 7, 13, 14, 20, 21, 27, 28 reserving the lighter coloured sections 806 of the shared communications channel Two resource blocks remain unused in this case, which could contain other control information. This is perhaps not a likely way to split resources but is included as an illustrative example.

Figure 9:
FIG. 9 is a schematic block diagram of a further illustration of a wireless access interface for supporting device to device communications in accordance with the present technique.

A further example arrangement is shown in FIG. 9 of a wireless access interface which corresponds to another example arrangement of the present technique. As shown in FIG. 9, resources in the shared uplink transmission channel are divided into sections 1 to 252 and the corresponding scheduling region 901, 904 is divided into sections 1 to 252. In FIG. 9 another potential arrangement is shown, which allows more flexible scheduling. Each resource element in the scheduling channel corresponds to one traffic resource block. This means that the sub-carrier containing the scheduling region, and hence header information such as group identifier, will be the same sub-carrier where the traffic/payload part will be found. Although this is taking more of the available communications resources for scheduling information, it still provides the benefit that a UE can monitor with the scheduling region with discontinuous reception (DRX) and hence save power, rather than having to monitor all data blocks. It also uses communications resources more efficiently by not requiring header information to be sent with every block of data, if the communications devices are configured to specify one resource element in the scheduling channel along with a block of M×N resource blocks, in which they intend to transmit data. As with the above examples it would be preferable to use the scheduling assignment messages to reserve several resource blocks rather than individual resource blocks, because this would be more efficient.

FIG. 10 provides further examples of wireless access interfaces, which are configured, in accordance with the present technique, to provide a facility for D2D communications. In a first example FIG. 10a, a conventional LTE uplink carrier provides a plurality of resource blocks comprising OFDM symbols and subcarriers. In the example illustration, as with the examples shown in FIGS. 7, 8 and 9, one square represents a traditional resource block. Areas having different shading represent control (scheduling assignments) and traffic from different UEs. The amount of traffic reserved by a scheduling assignment may be larger or smaller than shown above. The scheduling assignment messages may also have a different size, depending on the amount of information which they need to convey. They may also be sent more or less frequently.

For the example showing in FIG. 10a a first section of the uplink communications channel 1001 is assigned to conventional uplink communications of an LTE uplink carrier. As explained above the top and bottom sections of resource 1002, 1004 are devoted to uplink control transmissions according to a conventional LTE arrangement. However, a section of resources 1006 is devoted to provide a scheduling region for transmitting scheduling assignment messages and control messages by devices operating to perform D2D communications. A second region 1008 is assigned to shared communications resources for D2D communications which are assigned by transmitting a scheduling assignment message in the corresponding region of the scheduling region 1006. These above examples are not limiting.

For the example illustrated in FIG. 10a, the frequency of the scheduling assignment messages implies the frequency of the data. The receiving UE detects a scheduling assignment message in the scheduling resources, and decodes the information which contains for example a group identifier for which it is a member. The UE then continues decoding this frequency to obtain the traffic information.

FIG. 10b provides a similar configuration. However for the example shown in FIG. 10b the scheduling region 1010 has a shorter duration allowing the region for data transmissions 1012 to be larger. According to this example the scheduling assignment from different UEs are sent at different times. The timing implies the frequency of the data transmissions. In contrast the example of FIG. 10c provides a larger scheduling region 1014 and a smaller shared resources region 1016. In this example, the scheduling assignment messages are transmitted repeatedly a number of times before sending data. This example may help with for example contention resolution.

Figure 10E:
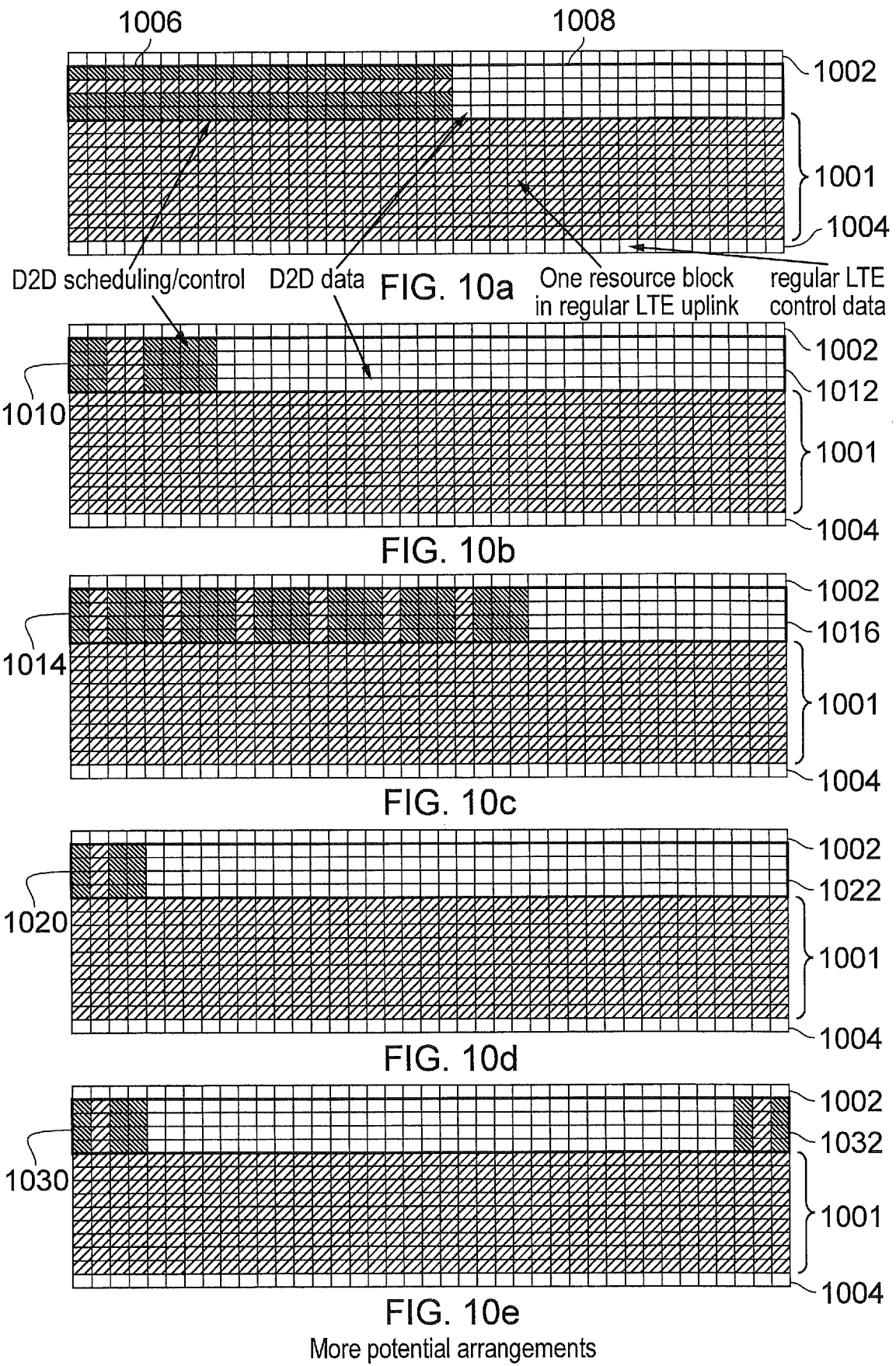

For examples shown in FIGS. 10d and 10e a further different configuration and partitioning of the scheduling region and the data transmission region is made. In FIG. 10d a first scheduling region 1020 is provided with a larger shared resource region 1022. For the example shown in FIG. 10e the scheduling region comprises a first region 1030 and a second region 1032 and the resources in between 1034 are allocated for shared communications resources for data transmission. The examples shown in FIGS. 10d and 10e illustrate examples of possible ways for the data itself to be time-multiplexed rather than by frequency. The timing of the scheduling assignments imply the timing of the data.

Contention Resolution

The embodiments of the present technique described above provide an arrangement in which a communication device can transmit a scheduling assignment message in preparation for transmitting data in a section of shared communications resources, which corresponds to the section of a scheduling region in which the scheduling assignment message was transmitted. As will be appreciated there is a finite probability that one of the other devices may contemporaneously transmit a scheduling assignment message in the same scheduling assignment section and subsequently transmit signals representing the data being communicated in the corresponding section of the shared resources. In some example embodiments a contention resolution arrangement may be used in order to detect the transmission of signals contemporaneously by two or more communications devices of the group so that each of the communications devices of the group may retransmit their scheduling assignment message in another scheduling assignment section at a later subframe. In other examples the communications devices may accept the loss of the transmission of the data and high layer protocols may arrange for this data to be retransmitted. In other examples a collision avoidance mechanism may be deployed, in order to detect that a collision has occurred, so that a retransmission may be made. In some example one or more of the communications devices of the group may transmit an indication that a collision has occurred, so that a re-transmission may be performed. For example a push-to-talk application allows users to detect when more than one user has attempted to transmit contemporaneously and the other users can request a re-transmission.

SUMMARY

According to the example embodiments explained above, a time and frequency position of transmission of scheduling assignment messages in the scheduling assignment channel/region determines, at least in part, the communications resources of a shared channel which will be used by a UE to transmit signals representing data, which is being transmitted to other communications devices. In some examples the scheduling assignment messages may include additional control/header information such as group/sender identification for security.

Embodiments of the present technique can therefore provide an arrangement in which D2D communications can be performed via a wireless access interface in which a time-frequency position of a scheduling assignment message reduces the amount of information that needs to be transmitted and therefore consumes less radio resources for scheduling. Furthermore in some embodiments data and header parts of transmissions can be separated, thereby using communications resources more efficiently, and an identifier of the communications device or a group of communications devices in which the communications device belongs may be transmitted in the scheduling assignment message. As will be appreciated a further example is provided because a communications device only needs to monitor the scheduling assignment channel/region which may occur relatively in frequently thereby allowing the device to power down so that it can save power. If the group of communications devices are within range of an eNodeB, then the eNodeB can perform scheduling, so that the communications device can be informed via the Up-link channel to all UEs in a group without having to establish a radio resource control (RRC) connection or scheduling via down-link channels.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In the foregoing description D2D communications are described with reference to an LTE system, however the presently disclosed techniques are equally applicable to other LTE system structures and other systems which are compatible with D2D communications.

The following numbered clauses provide further example aspects and features of the present technique:

1. A communications device comprising
a transmitter configured to transmit signals to one or more other communications devices via a wireless access interface to perform device-to-device communications,
a receiver configured to receive signals from the one or more other communications devices via the wireless access interface, and
a controller for controlling the transmitter and the receiver to transmit or to receive the signals via the wireless access interface to transmit or to receive data represented by the signals, the wireless access interface providing
a scheduling region comprising a plurality of predetermined sections of communications resources, and
a plurality of predetermined sections of shared communications resources, wherein each of the plurality of predetermined sections of the scheduling region correspond to one of the plurality of sections of the shared communications resources, so that transmitting in one or more of the plurality of the sections of the scheduling region reserves one or more corresponding sections of the shared communications resources for transmitting the signals representing the data.

2. A communications device according to clause 1, wherein the controller is configured to control the transmitter
to transmit a message in one of the sections of the scheduling region, and
to transmit the signals representing the data in the section or sections of the plurality of shared communications resources which corresponds to the section of the scheduling region in which the message was transmitted.

3. A communications device according to clause 2, wherein the controller is configured in combination with the receiver
to monitor signals transmitted within the plurality of the sections of the scheduling region, and
after detecting one or more messages transmitted in any of the plurality of the sections of the scheduling region,
to detect signals transmitted in the sections of the shared communications resources which correspond to the sections of the one or more scheduling region in which the messages were received.

4. A communications device according to clause 1, 2 or 3, wherein the wireless access interface is divided into a plurality of time divided units and
the scheduling region comprising the plurality of the predetermined sections of communications resources is provided in one of the time divided units, and
the plurality of sections of the shared communications resources is provided in at least one other of the time divided units.

5. A communications device according to clause 4, wherein
the scheduling region comprising the plurality of the predetermined sections of communications resources is provided periodically in the time divided units, the occurrences of the scheduling region being separated by one or more time divided units providing the plurality of sections of the shared communications resources, the period of the scheduling regions being determined by the one or more time divided units of the shared communications resources between the time divided units of the scheduling regions.

6. A communications device according to any of clauses 1 to 5, wherein the messages include an indication of more than one of the sections of the shared communications resources in which the signals representing the data are to be transmitted, at least one of the more than one sections of the shared communications resources corresponding to the section of the scheduling region in which the message was transmitted.

7. A communications device according to clause 6, wherein the messages include parameters N and M, which represent N resource blocks in time and M resource blocks in frequency of the blocks of the shared communications resources.

8. A communications device according to clause 6 or 7, wherein the messages include an identifier of the communications device, which transmitted the scheduling assignment message.

9. A communications device according to clause 6 or 7, wherein the one or more communications devices form a group, and the messages include an identifier of the group of the one or more communications devices which transmitted the message.

10. A communications device according to clause 6 or 7, wherein the messages include information identifying the type of information which will be sent in the shared resources.

11. A communications device according to any of clauses 4 to 10, wherein the one or more sections of the shared communications resources which are reserved for the transmission of signals representing the data by transmitting the message in the corresponding section of the scheduling region are separated from the scheduling region in which the message was transmitted by at least one time unit.

12. A communications device according to any of clauses 1 to 10, wherein
the transmitter is configured to transmit signals to an infrastructure equipment of a mobile communications network via the wireless access interface,
the receiver is configured to receive signals from the infrastructure equipment via the wireless access interface, and
the controller is configured to control the transmitter and the receiver to transmit or to receive the signals to or from the infrastructure equipment via the wireless access interface to transmit or to receive data represented by the signals via the mobile communications network, the wireless access interface being formed by scheduling the signals for reception by the communications devices and the transmission of signals for transmission by the communications device providing
a downlink reception channel comprising a down-link control channel and a downlink shared communications resources for allocation to the communications device to receive the signals representing the data, and
an uplink transmission channel including an up-link control channel and uplink shared communications resources for allocation to the communications device to transmit the signals representing the data to the infrastructure equipment, the allocation of the communications resources of the down-link shared channel and the communications resources of the uplink shared channel being made by the infrastructure equipment, wherein the controller is configured in combination with the transmitter and the receiver, when in a device to device mode, to re-configure the wireless access interface for use in transmitting the data to the one or more other communications devices, the re-configured wireless access interface comprising, within the uplink transmission channel,
the scheduling region comprising the plurality of the predetermined sections of communications resources within the up-link transmission channel, and
the plurality of sections of the shared communications resources are provided within the up-link transmissions channel 13. A method of communicating data comprising
transmitting signals to one or more other communications devices via a wireless access interface to perform device-to-device communications,
receiving signals from the one of the other communications devices via the wireless access interface, and
controlling the transmitter and the receiver to transmit or to receive the signals via the wireless access interface to transmit or to receive data represented by the signals, the wireless access interface providing
a scheduling region comprising a plurality of predetermined sections of communications resources, and
a plurality of sections of shared communications resources, wherein each of the plurality of predetermined sections of the scheduling region correspond to one of the plurality of sections of the shared communications resources, so that transmitting in one of the plurality of the sections of the scheduling region reserves at least one corresponding section of the shared communications resources for transmitting the signals representing the data.

14. A method according to clause 13, comprising
transmitting a message in one of the sections of the scheduling region, and
transmitting the signals representing the data in the section or sections of the plurality of shared communications resources which corresponds to the section of the scheduling region in which the message was transmitted.

15. A method according to clause 13, comprising
monitoring signals transmitted within the plurality of the sections of the scheduling region, and after detecting one or more messages transmitted in any of the plurality of the sections of the scheduling region,
detecting signals transmitted in the sections of the shared communications resources which correspond to the sections of the one or more scheduling region in which the messages were received.

16. A method according to clause 13, 14 or 15, wherein the wireless access interface is divided into a plurality of time divided units and
the scheduling region comprising the plurality of the predetermined sections of communications resources is provided in one of the time divided units, and
the plurality of sections of the shared communications resources is provided in at least one other of the time divided units.

17. A method according to clause 15, wherein
the scheduling region comprising the plurality of the predetermined sections of communications resources is provided periodically in the time divided units, the occurrences of the scheduling region being separated by one or more time divided units providing the plurality of sections of the shared communications resources, the period of the scheduling regions being determined by the one or more time divided units of the shared communications resources between the time divided units of the scheduling regions.

18. A method according to any of clauses 13 to 17, wherein the messages include an indication of more than one of the sections of the shared communications resources in which the signals representing the data are to be transmitted, at least one of the more than one sections of the shared communications resources corresponding to the section of the scheduling region in which the message was transmitted.

19. Circuitry for a communications device comprising
transmitter circuitry configured to transmit signals to one or more other communications devices via a wireless access interface to perform device-to-device communications,
receiver circuitry configured to receive signals from the one or more other communications devices via the wireless access interface, and
controller circuitry for controlling the transmitter and the receiver to transmit or to receive the signals via the wireless access interface to transmit or to receive data represented by the signals, the wireless access interface providing
a scheduling region comprising a plurality of predetermined sections of communications resources, and
a plurality of predetermined sections of shared communications resources, wherein each of the plurality of predetermined sections of the scheduling region correspond to one of the plurality of sections of the shared communications resources, so that transmitting in one or more of the plurality of the sections of the scheduling region reserves one or more corresponding sections of the shared communications resources for transmitting the signals representing the data.

20. Circuitry according to clause 19, wherein the controller circuitry is configured to control the transmitter circuitry
to transmit a message in one of the sections of the scheduling region, and
to transmit the signals representing the data in the section or sections of the plurality of shared communications resources which corresponds to the section of the scheduling region in which the message was transmitted.

21. Circuitry according to clause 19, wherein the controller circuitry is configured in combination with the receiver circuitry
to monitor signals transmitted within the plurality of the sections of the scheduling region, and
after detecting one or more messages transmitted in any of the plurality of the sections of the scheduling region,
to detect signals transmitted in the sections of the shared communications resources which correspond to the sections of the one or more scheduling region in which the messages were received.

REFERENCES

[1] R2-133840, "CSMA/CA based resource selection," Samsung, published at 3GPP TSG-RAN WG2 #84, San Francisco, USA, 11-15 Nov. 2013.
[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.
[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.
[4] R2-134426, "Medium Access for D2D communication", LG Electronics Inc, published at 3GPP TSG-RAN WG2 #84, San Francisco, USA, 11-15 Nov. 2013.
[5] R2-134238, "D2D Scheduling Procedure", Ericsson, published at 3GPP TSG-RAN WG2 #84, San Francisco, USA, 11-15 Nov. 2013.
[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.
[7] R2-134431, "Simulation results for D2D voice services using connectionless approach", General Dynamics Broadband UK, published at 3GPP TSG-RAN WG2 #84, San Francisco, USA, 11-15 Nov. 2013.
[8] "D2D Resource Allocation under the Control of BS", Xiaogang R. et al, University of Electronic Science and Technology of China, https://mentor.ieee.org/802.16/den/13/16-13-0123-02-000n-d2d-resource-allocation-under-the-control-of-bs.docx
[9] US20130170387
[10] US20120300662
[11] LTE for UMTS: OFDMA and SC-FDMA Based Radio Access, Harris Holma and Antti Toskala, Wiley 2009, ISBN 978-0-470-99401-6.

The invention claimed is:
1. A communications device, comprising:
a transmitter configured to transmit signals to one or more other communications devices via a wireless access interface to perform device-to-device (D2D) communications;

a receiver configured to receive signals from the one or more other communications devices via the wireless access interface; and control circuitry for controlling the transmitter and the receiver to transmit or to receive the signals via the wireless access interface to transmit or to receive data represented by the signals, the wireless access interface providing a downlink reception channel for allocation to the communications device to receive the data, an uplink transmission channel for allocation to the communications device to transmit the data, a scheduling region comprising a plurality of sections of communications resources, and a plurality of sections of shared communications resources, wherein each of the plurality of sections of the scheduling region correspond to one of the plurality of sections of the shared communications resources, so that transmitting in one or more of the plurality of the sections of the scheduling region reserves one or more corresponding sections of the shared communications resources for transmitting the signals representing the data, and the control circuitry is configured to control the transmitter to, when in a D2D mode, re-configure the wireless access interface for use in transmitting the data to the one or more other communications devices, the re-configured wireless access interface including the scheduling region is provided within the up-link transmission channel, and the plurality of sections of the shared communications resources are provided within the up-link transmissions channel.

2. The communications device as claimed in claim 1, wherein the control circuitry is configured to control the transmitter to transmit a message in one of the sections of the scheduling region, and transmit the signals representing the data in the section or sections of the plurality of shared communications resources which corresponds to the section of the scheduling region in which the message was transmitted.

3. The communications device as claimed in claim 2, wherein the control circuitry is configured in combination with the receiver to monitor signals transmitted within the plurality of the sections of the scheduling region, and detect, after detecting one or more messages transmitted in any of the plurality of the sections of the scheduling region, signals transmitted in the sections of the shared communications resources which correspond to the sections of the one or more scheduling region in which the messages were received.

4. The communications device as claimed in claim 1, wherein the wireless access interface is divided into a plurality of time divided units, the scheduling region comprising the plurality of the sections of communications resources is provided in one of the time divided units, and the plurality of sections of the shared communications resources is provided in at least one other of the time divided units.

5. The communications device as claimed in claim 4, wherein the scheduling region comprising the plurality of the sections of communications resources is provided periodically in the time divided units, the occurrences of the scheduling region being separated by one or more time divided units providing the plurality of sections of the shared communications resources, the period of the scheduling regions being determined by the one or more time divided units of the shared communications resources between the time divided units of the scheduling regions.

6. The communications device as claimed in claim 1, wherein messages include an indication of more than one of the sections of the shared communications resources in which the signals representing the data are to be transmitted, at least one of the more than one sections of the shared communications resources corresponding to the section of the scheduling region in which the message was transmitted.

7. The communications device as claimed in claim 6, wherein the messages include parameters N and M, which represent N resource blocks in time and M resource blocks in frequency of the blocks of the shared communications resources.

8. The communications device as claimed in claim 6, wherein the messages include an identifier of the communications device, which transmitted the scheduling assignment message.

9. The communications device as claimed in claim 6, wherein the one or more communications devices form a group, and the messages include an identifier of the group of the one or more communications devices which transmitted the message.

10. The communications device as claimed in claim 6, wherein the messages include information identifying the type of information which will be sent in the shared resources.

11. The communications device as claimed in claim 4, wherein one or more sections of the shared communications resources which are reserved for the transmission of signals representing the data by transmitting the message in the corresponding section of the scheduling region are separated from the scheduling region in which the message was transmitted by at least one time unit.

12. A The communications device as claimed in claim 1, wherein the transmitter is configured to transmit signals to an infrastructure equipment of a mobile communications network via the wireless access interface, the receiver is configured to receive signals from the infrastructure equipment via the wireless access interface, and the control circuitry is configured to control the transmitter and the receiver to transmit or to receive the signals to or from the infrastructure equipment via the wireless access interface to transmit or to receive data represented by the signals via the mobile communications network, the wireless access interface being formed by scheduling the signals for reception by the communications devices and the transmission of signals for transmission by the communications device.

13. A method of communicating data, the method comprising:

transmitting signals to one or more other communications devices via a wireless access interface to perform device-to-device (D2D) communications;

receiving signals from the one of the other communications devices via the wireless access interface;

controlling the transmitter and the receiver to transmit or to receive the signals via the wireless access interface to transmit or to receive data represented by the signals, the wireless access interface providing
- a downlink reception channel for allocation to the communications device to receive the data,
- an uplink transmission channel for allocation to the communications device to transmit the data,
- a scheduling region comprising a plurality of sections of communications resources, and
- a plurality of sections of shared communications resources, Wherein each of the plurality of sections of the scheduling region correspond to one of the plurality of sections of the shared communications resources, so that transmitting in one of the plurality of the sections of the scheduling region reserves at least one corresponding section of the shared communications resources for transmitting the signals representing the data; and when in a D2D mode, re-configuring the wireless access interface for use in transmitting the data to the one or more other communications devices the re-configured wireless access interface including the scheduling region is provided within the up-link transmission channel and the plurality of sections of the shared communications resources are provided within the up-link transmissions channel.

14. The method as claimed in claim 13, further comprising:
transmitting a message in one of the sections of the scheduling region; and
transmitting the signals representing the data in the section or sections of the plurality of shared communications resources which corresponds to the section of the scheduling region in which the message was transmitted.

15. The method as claimed in claim 13, further comprising:
monitoring signals transmitted within the plurality of the sections of the scheduling region; and
after detecting one or more messages transmitted in any of the plurality of the sections of the scheduling region, detecting signals transmitted in the sections of the shared communications resources which correspond to the sections of the one or more scheduling region in which the messages were received.

16. The method as claimed in claim 13, wherein
the wireless access interface is divided into a plurality of time divided units,
the scheduling region comprising the plurality of the sections of communications resources is provided in one of the time divided units, and
the plurality of sections of the shared communications resources is provided in at least one other of the time divided units.

17. The method as claimed in claim 15, wherein the scheduling region comprising the plurality of the sections of communications resources is provided periodically in the time divided units, the occurrences of the scheduling region being separated by one or more time divided units providing the plurality of sections of the shared communications resources, the period of the scheduling regions being determined by the one or more time divided units of the shared communications resources between the time divided units of the scheduling regions.

18. The method as claimed in claim 13, wherein messages include an indication of more than one of the sections of the shared communications resources in which the signals representing the data are to be transmitted, at least one of the more than one sections of the shared communications resources corresponding to the section of the scheduling region in which the message was transmitted.

19. Circuitry for a communications device, the circuitry comprising:
transmitter circuitry configured to transmit signals to one or more other communications devices via a wireless access interface to perform device-to-device (D2D) communications;
receiver circuitry configured to receive signals from the one or more other communications devices via the wireless access interface; and
controller circuitry for controlling the transmitter and the receiver to transmit or to receive the signals via the wireless access interface to transmit or to receive data represented by the signals, the wireless access interface providing
- a downlink reception channel for allocation to the communications device to receive the data,
- an uplink transmission channel for allocation to the communications device to transmit the data,
- a scheduling region comprising a plurality of sections of communications resources, and
- a plurality of sections of shared communications resources, wherein each of the plurality of sections of the scheduling region correspond to one of the plurality of sections of the shared communications resources, so that transmitting in one or more of the plurality of the sections of the scheduling region reserves one or more corresponding sections of the shared communications resources for transmitting the signals representing the data, and
the controller circuitry is configured to control the transmitter to, when in a D2D mode, re-configure the wireless access interface for use in transmitting the data to the one or more other communications devices, the re-configured wireless access interface including the scheduling region is provided within the up-link transmission channel, and the plurality of sections of the shared communications resources are provided within the up-link transmissions channel.

20. The circuitry as claimed in claim 19, wherein the controller circuitry is configured to control the transmitter circuitry to
transmit a message in one of the sections of the scheduling region, and
transmit the signals representing the data in the section or sections of the plurality of shared communications resources which corresponds to the section of the scheduling region in which the message was transmitted.

21. The circuitry as claimed in claim 19, wherein the controller circuitry is configured in combination with the receiver circuitry to
monitor signals transmitted within the plurality of the sections of the scheduling region, and
detect, after detecting one or more messages transmitted in any of the plurality of the sections of the scheduling region, signals transmitted in the sections of the shared communications resources which correspond to the sections of the one or more scheduling region in which the messages were received.

* * * * *